No. 887,461. PATENTED MAY 12, 1908.
J. W. CARD.
TOPPER ATTACHMENT FOR LAWN MOWERS.
APPLICATION FILED FEB. 14, 1908.
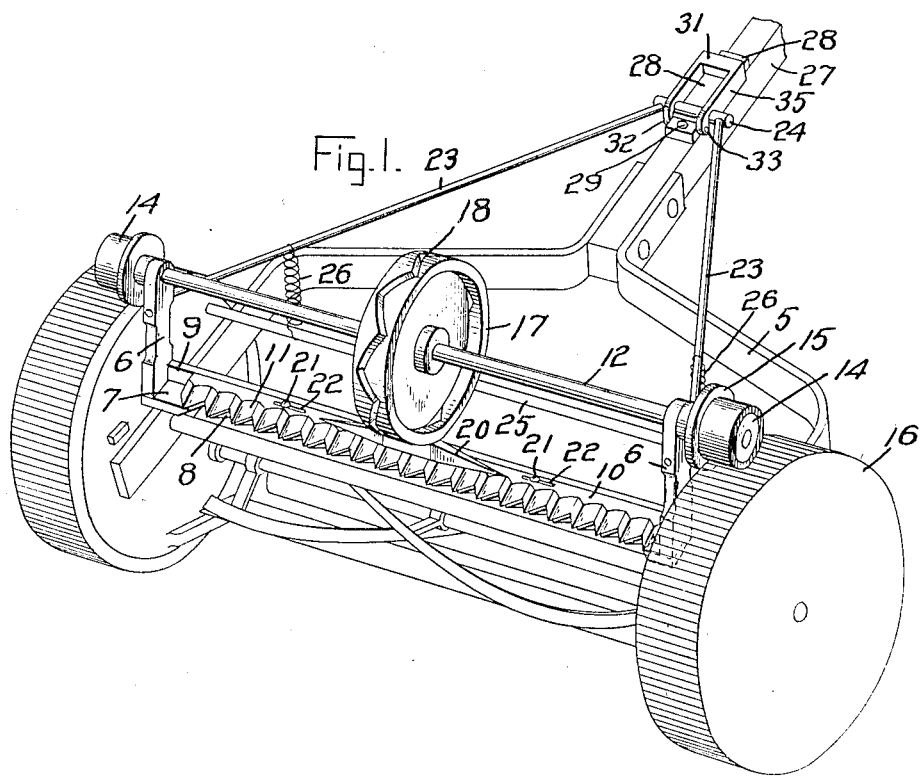
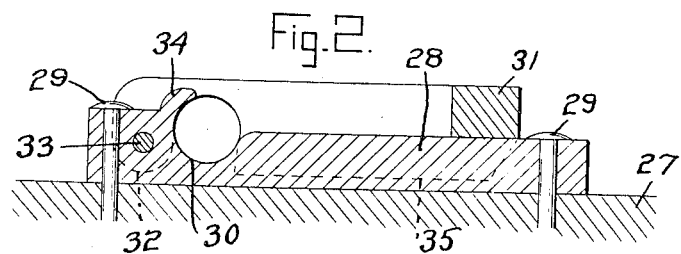
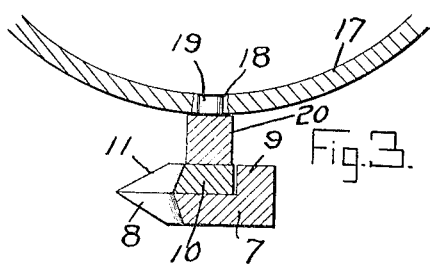
Witnesses
Inventor
J W Card

UNITED STATES PATENT OFFICE.

JOHN W. CARD, OF DRYDEN, NEW YORK.

TOPPER ATTACHMENT FOR LAWN-MOWERS.

No. 887,461.  Specification of Letters Patent.  Patented May 12, 1908.

Application filed February 14, 1908. Serial No. 415,823.

*To all whom it may concern:*

Be it known that I, JOHN W. CARD, a citizen of the United States, residing at Dryden, in the county of Tompkins and State of New York, have invented certain new and useful Improvements in Topper Attachments for Lawn-Mowers, of which the following is a specification.

This invention relates to certain new and useful improvements in lawn mower attachments, and it relates more particularly to a device adapted to be attached to any ordinary lawn mower, and employed for the purpose of "topping" or cutting off the upper portion of the grass blades, in order that the lawn mower may be used for the purpose of cutting grass of a longer length than it will ordinarily cut.

One of the primary objects of my invention is to provide a device which may be readily attached to or detached from an ordinary lawn mower, and another of the primary objects, and a principal one of my invention is to provide an attachment of the type described which can be operated by frictional contact of rollers or wheels carried thereby with the drive-wheels of the lawn mower.

The invention comprises a supporting frame carrying a cutter bar, with a reciprocatory knife bar mounted to work on the cutter bar, a shaft journaled in the frame and provided with frictional pulleys to engage with the drive wheels of the lawn mower, means carried by said shaft to reciprocate the cutter knife, and means for adjustably-securing the device to the lawn mower frame, and to the handle of the lawn mower.

In describing the invention in detail, reference will be had to the accompanying drawings forming a part of this application, and wherein like numerals of reference will be employed to indicate like parts throughout the several views, in which:—

Figure 1 is a perspective view of the attachment applied in position on a lawn mower, Fig. 2 is a longitudinal sectional view of the two-part clamp by means of which the attachment is connected to the handle, also showing a part of said handle. Fig. 3 is a cross sectional view of the cutter bar and knife showing a part of the operating cam.

In the accompanying drawings the lawn mower 5 is illustrated largely diagrammatically, since my invention resides in the device which is to be attached to the lawn mower.

The attachment comprises a frame embodying two end standards 6 which at their lower end are formed integral with or rigidly connected to the ends of the cutter bar 7. This cutter bar 7 is provided along its forward edge with knife sections 8, and along its rear edge is provided with an upwardly-extending flange 9.

Mounted on the cutter bar 7 is the reciprocatory cutter knife 10, provided along its forward edge with the knife sections 11 which operate in conjunction with the knife sections 8 to cut the grass.

Journaled in the standards 6 near the upper ends thereof is an operating shaft 12, the ends of which project beyond the standards 6, and on each end is mounted a friction wheel 14 herein shown as being provided with a tread of rubber, leather or the like. These friction wheels 14 may be provided with flanges 15, as shown to project below the inner rim of the lawn mower wheels, 16, with which the friction wheels 14 are adapted to engage as shown in Fig. 1 of the drawings.

Mounted centrally on the drive shaft 12 is a wheel 17 provided in its periphery with a continuous cam groove 18, in which engages a pin 19 carried on a rib 20 provided on the upper face of the cutter knife 10, centrally of the length of the latter.

It will be evident that as the lawn mower is moved forward, the friction wheels 14 engaging the wheels 16 will impart rotary movement to the shaft 12, and the shaft 12 will impart rotary movement to the cam wheel 17, and the cam wheel 17 will impart reciprocatory movement to the cutter knife 10. This cutter knife 10 is held in proper position on the cutter bar by means of pins 21 operating in slots 22, provided therefor in said cutter knife 10.

The description so far given embraces the operating parts of the attachment, and to secure the attachment to a lawn mower, I provide a connecting frame embodying two reach rods 23 attached at their forward ends to the standards 6, these reach rods converging towards each other at their rear ends and being connected by a cross pin or bar 24. Connected to the reach rods 23 and to the cross rod 25 or other part of the lawn mower frame, are springs 26 which tend to hold the frame at the forward end so that the friction wheels 14 will normally engage with the drive wheels 16 of the lawn mower. The cross pin or bar 24 is connected to the handle 27 of the lawn mower by means of a two-part clamp embodying a base plate 28 which is fixedly secured to the handle 27 as by bolts 29 at the ends of said base plate. This base plate is provided near its lower end with a seat 30 which receives the cross bar by means of a frame 31 provided at its lower end with lugs 32 apertured to receive a pivot pin or bolt 33 passing through said lugs and through the base plate as clearly seen in Fig. 2. The base plate 28 is provided on its upper face with a lip 34 which partly overlies the seat 30, so as to receive any upward thrust that may be delivered to the cross pin or bar 24. The frame 31 is provided with downwardly-extending side flanges which overlap the sides of the base plate 28 as seen in dotted lines in Fig. 2.

It will be observed that to disconnect the attachment it is only necessary to swing the frame 31 upon its pivot pin 33, disconnect the springs 26 from the rod 25 and the frame can then be lifted from the lawn mower, and the cross pin or bar 24 removed from its seat. The two-part clamp above described remains on the handle of the lawn mower so as to be in position when it is again desired to attach the device.

It will be observed that the cutter bar of the attachment lies on a plane some distance above the plane of the cutter bar of the lawn mower, and consequently will operate on the grass at a point considerably higher than the cutter bar or knife of the lawn mower. By this means I am able to top the grass in such a manner that grass which would ordinarily choke the lawn mower, owing to the length thereof, may be readily operated upon by the lawn mower when my attachment is applied thereto.

Having fully described my invention, what I claim as new and desire to secure by Letters Patent is:—

1. An attachment for lawn mowers, comprising a frame embodying end standards and a cutter bar provided with knife sections, a reciprocatory cutter knife on said cutter bar, a shaft journaled in said end standards and provided on the ends with friction wheels to engage drive wheels of a lawn mower, means mounted on said shaft to impart reciprocatory movement to said cutter knife, reach rods connected to said standards, means for connecting said reach rods to a lawn mower frame, and means for detachably-connecting the reach rods to the lawn mower handle.

2. In combination with a lawn mower, a grass topping attachment comprising a frame embodying a cutter bar and end standards, a cutter knife mounted for reciprocation on the cutter bar, a drive shaft journaled in the end standards, friction wheels on the ends of said drive shaft engaging the drive wheels of said lawn mower, a pin carried by the cutter knife, a wheel on said drive shaft having a cam groove to receive said pin, reach rods connected to said end standards, and means for detachably-connecting said reach rods to the lawn mower handle.

3. In combination with a lawn mower, a grass topping attachment detachably-secured to the lawn mower and embodying a reciprocatory cutter knife, and means for frictional engagement with the drive wheels for imparting reciprocatory movement to the cutter knife.

4. In combination with a lawn mower, a topping attachment detachably-connected to the lawn mower and embodying a reciprocatory cutter knife, an operating means for said cutter knife actuated by frictional engagement with the drive wheels of the lawn mower.

In testimony whereof I affix my signature in presence of two witnesses.

JOHN W. CARD.

Witnesses:
HARVEY C. LOOMIS,
GEO. E. GOODRICH.